United States Patent
Hirka et al.

(10) Patent No.: US 8,326,766 B2
(45) Date of Patent: Dec. 4, 2012

(54) SYSTEM AND METHOD FOR LINKED ACCOUNT HAVING SWEEP FEATURE

(75) Inventors: Jeffrey L. Hirka, Wilmington, DE (US); Steven J. Fox, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 839 days.

(21) Appl. No.: 11/697,440

(22) Filed: Apr. 6, 2007

(65) Prior Publication Data
US 2007/0198404 A1 Aug. 23, 2007

Related U.S. Application Data

(63) Continuation of application No. 09/655,886, filed on Sep. 6, 2000, now Pat. No. 8,015,084.

(51) Int. Cl.
*G06Q 40/00* (2012.01)
(52) U.S. Cl. ............... 705/75; 705/69; 705/40; 705/39
(58) Field of Classification Search ................ 705/39, 705/75, 235
See application file for complete search history.

(56) References Cited

U.S. PATENT DOCUMENTS

| | | | |
|---|---|---|---|
| 4,016,405 A | 4/1977 | McCune et al. | |
| 4,126,779 A * | 11/1978 | Jowers et al. | 705/40 |
| 5,455,407 A * | 10/1995 | Rosen | 705/69 |
| 6,021,397 A | 2/2000 | Jones et al. | |
| 6,047,270 A | 4/2000 | Joao et al. | |
| 6,205,437 B1 * | 3/2001 | Gifford | 705/75 |
| 6,222,914 B1 | 4/2001 | McMullin | |
| 6,715,679 B1 | 4/2004 | Infosino | |
| 7,392,224 B1 | 6/2008 | Bauer et al. | |
| 2001/0042785 A1 | 11/2001 | Walker et al. | |
| 2002/0123965 A1 | 9/2002 | Phillips | |
| 2003/0097331 A1 | 5/2003 | Cohen | |
| 2004/0117302 A1 | 6/2004 | Weichert et al. | |

OTHER PUBLICATIONS

Army MWR Card, *Quick Reference Guide*, 2 pps.
U.S. Army MWR Club Membership, Platinum MasterCard, Card Highlights, 9 pps.

* cited by examiner

*Primary Examiner* — Charles Kyle
(74) *Attorney, Agent, or Firm* — Goodwin Procter LLP

(57) ABSTRACT

A computer-implemented method for facilitating electronic funds transactions is disclosed. According to one embodiment, the method may comprise the steps of: issuing a transaction card to a cardholder by associating the transaction card with a demand deposit account from which the cardholder is authorized to electronically disburse funds; receiving an authorization request for an attempted transaction between a merchant and the cardholder, the authorization request containing information associated with the transaction card and the attempted transaction; processing the authorization request based on one or more predetermined business rules; authorizing the transaction without immediately settling the transaction against the demand deposit account of the cardholder; and settling the transaction, at a time subsequent to the execution of the transaction, through automated clearing house (ACH) from funds retained within the demand deposit account of the cardholder.

11 Claims, 7 Drawing Sheets

SYSTEM AND METHOD FOR LINKED ACCOUNT HAVING SWEEP FEATURE

FIELD OF THE INVENTION

The invention relates generally to electronic commerce, and more particularly to a linked account that allows cardholders to apply funds in a cash demand deposit account or other account to transactions with a credit card, in a manner which allows these transactions to be automatically reconciled against the cash account on a daily or other basis.

BACKGROUND OF THE INVENTION

The consumer credit industry has played a significant role in electronic and other commerce. Millions of Americans use traditional bank-sponsored credit cards, private merchant sponsored cards, debit cards, stored value cards, combinations of those instruments and other accounts for retail, Internet and other purposes. Credit cards in particular offer conveniences and advantages, successfully attracting consumers who wish to simplify their shopping experience by leaving their cash and checkbooks behind. Rewards programs also enhance credit card usage.

Despite the convenience of credit cards, many individuals may prefer to avoid using them. For example, some individuals may be reluctant to use credit cards because they are averse to outstanding account balances, and wish to avoid interest charges on their purchases. Other consumers may prefer to avoid the temptation of purchasing power in excess of their immediate ability to pay. Yet other consumers may desire credit access, but are denied that access due to past credit history.

For these and other reasons, cash accounts such as bank debit cards have emerged to service consumer needs. A debit card is a card that may be linked to a consumer's cash account, such as a demand deposit account (DDA), typically a checking account. When the consumer wishes to make a purchase from a merchant, the debit card is swiped at the point of sale as a credit card would be, except the funds used to pay the merchant are deducted from the cardholders checking account rather than paid from a third party credit network. The need to carry a checkbook is eliminated, while concerns regarding credit cards are avoided.

There are, however, disadvantages to debit cards as a payment instrument. First, not all banks offer debit cards. This forces potential debit card users to open accounts elsewhere if their banks do not offer this service. Second, a consumer may not have time to keep track of precise balances on their cash account, so that the cash balance on the debit card or other instrument may be used up unknowingly.

Thus, some debit cards offer overdraft protection in the form of a secondary line of credit. A checking account accessible with a debit card, for example, may be backed by a credit line for use in the event that there are insufficient funds in the checking account to cover a purchase.

Once a person has exceeded their available cash balance and invoked the credit line, they can continue to make purchases until they have maxed out this secondary credit line. This may occur without the consumer becoming aware of that status until the limit is reached, when repayment may be more difficult.

Further, in some instances, debit card users may not be offered the same type of rewards that credit card users are eligible for.

A need therefore exists for a versatile financial instrument that permits consumers to make purchases with the funds being drawn from a desired demand deposit account held at any financial institution.

Additionally, a need exists for consumers to have a more controlled access to an overdraft credit line.

A need also exists for an instrument that will attract reluctant consumers by offering them the ability to make purchases by drawing funds from a demand deposit account, while earning points or credits toward various rewards. Other problems exist.

SUMMARY OF THE INVENTION

The invention solving these and other problems relates to a system and method for a linked account having a sweep feature, enabling individuals to purchase goods and services from a merchant using a cash account backed by a credit account, but with overdrafts being reconciled automatically on a daily or other basis.

According to one embodiment of the invention, a user may receive a linked account instrument that is linked to a cash account, such as a demand deposit account (DDA) already held by the user. The consumer may be assigned a predetermined cumulative limit or maximum daily "open to buy" amount that limits the dollar amount of goods and services that may be purchased against that account, which limit may be independent of the actual cash balance in the account. Purchases can be made by swiping the instrument (for example, an encoded card) at a merchant point of sale (P.O.S.) terminal or other site. The merchant may receive an instantaneous authorization decision from an authorization server via a processing network.

At a predetermined time each day, transactions made using the linked account card may first be processed against the user's designated cash account. The cash account may be examined to determine whether there are sufficient funds to satisfy the charges incurred by the cardholder that day.

If sufficient funds are found in the cash account, the aggregate transaction amount may be withdrawn from that account and deducted against the sweep card's daily "open to buy" amount.

If the cash account does not have sufficient funds to cover the aggregate transaction amount, the cardholder's ability to make additional purchases may be suspended. In this case, any transactions causing the aggregate transaction amount to exceed the cash account balance may be processed as a credit charge against a linked credit account, in overdraft fashion.

After the placing of the overdraft on the credit account, a check or sweep may be automatically made against the cash account at 12:01 a.m. the next day or other later time to check for sufficient funds to cover the extended overdraft credit. If sufficient cash account funds are present at the time of a subsequent sweep, the funds may be withdrawn from the cash account and the charge on the credit account may be cleared. The cardholder may be charged a fee for the use of the credit account.

If the first sweep of the cash account does not find sufficient funds to satisfy the outstanding overdraft amount on the credit account, the linked account card privileges may remain suspended and interest charges may accrue on the outstanding credit card balance until satisfaction is made.

One advantage of the invention is the ability of a cardholder to set up a cash account of their choice to make purchases, and have the funds withdrawn from one or more of demand deposit or other accounts, regardless of the institution holding the account. This allows consumers to benefit from card purchases even if their bank does not offer traditional debit-card services.

Another advantage of the invention is the flexibility of the collateral credit account. The consumer may use an existing credit account, open a credit account with the institution issuing the linked account card, or set up another type of account to supply the overdraft protection.

Yet another advantage of the invention is the ability to perform a series of automatic sweeps of the cash account in search of adequate funds. If adequate funds become available during one of the subsequent sweeps, they may be withdrawn from the cash account and the credit account may be cleared at the earliest possible opportunity. This provides advantages over a traditional debit card account, where a cardholder may have to pay off the overdraft by visiting the bank or mailing a check to the bank.

Conversely, regardless of the constituent accounts, the institution issuing the linked account card is presented with several options for handling necessary overdrafts. Based on past credit history, for example, a cardholder may be given the privilege of continuing to draw from the available line of credit without having the card privileges suspended. If a cardholder's credit history does not indicate such a feature, or if the consumer declines such a feature, the issuing institution may constrain the cardholder by suspending card privileges if a predetermined number of sweeps do not find adequate funds in the cash account.

Additional features and advantages of the invention will be apparent from the description that follows, or may be learned by practice of the invention.

BRIEF DESCRIPTION OF THE DRAWINGS

The invention will be described with respect to the accompanying drawings, in which like elements are referenced with like numbers.

DETAILED DESCRIPTION OF PREFERRED EMBODIMENTS

Figure 1:
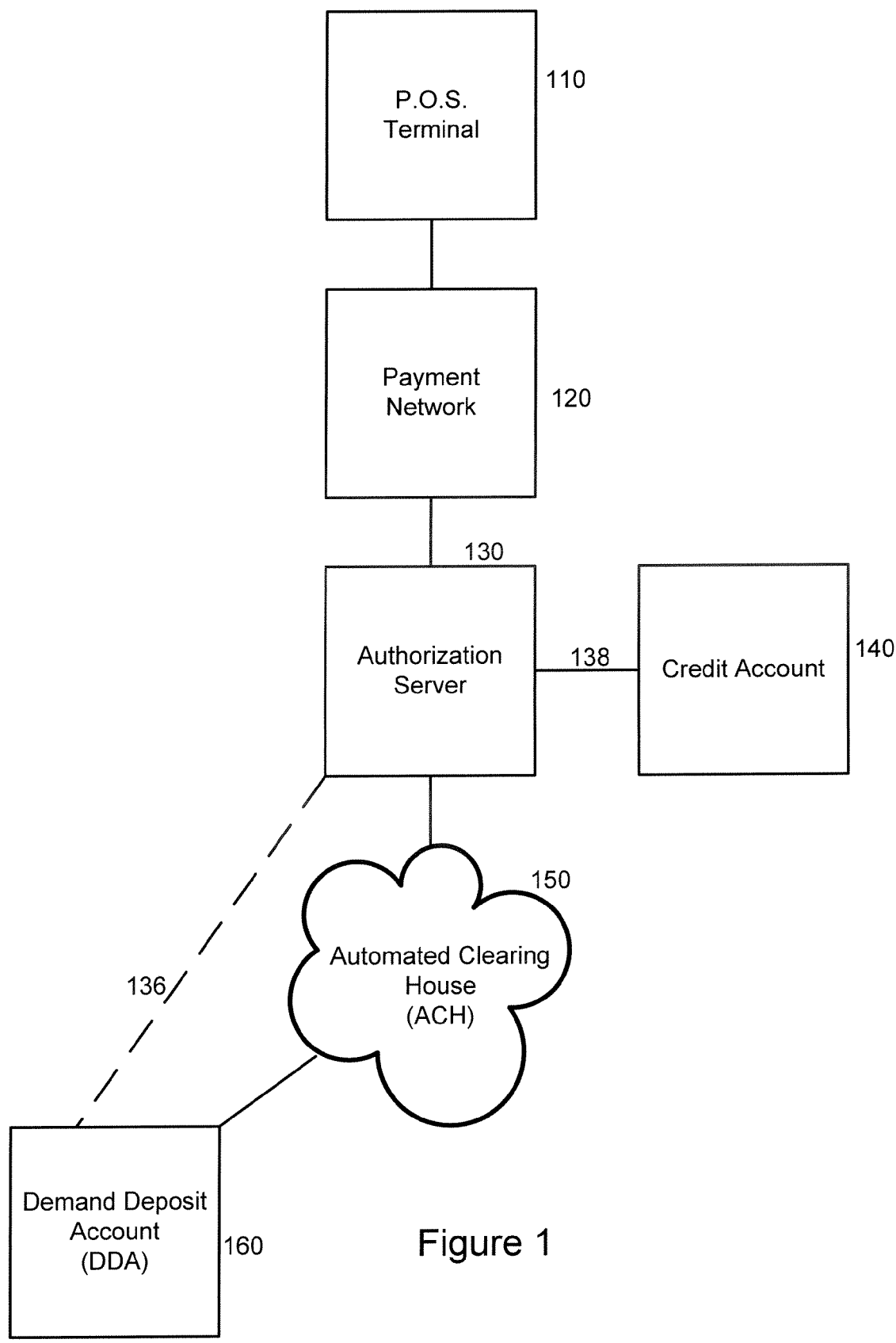
FIG. 1 is a schematic diagram of a system supporting a linked account card according to an embodiment of the invention.

FIG. 1 illustrates a schematic overview of various components of a transaction architecture supporting the use of a linked account according to the invention. A linked account instrument (not shown, for instance a magnetically encoded plastic card similar to a credit card or ATM card) may be provided to consumers to access funds in an existing cash account 160 such as a DDA held at a financial institution, such as a bank or savings and loan, or other institution.

Transactions may be initiated by swiping the linked account card at a point of sale (P.O.S.) terminal 110 when purchasing goods and/or services from merchants, or via other mechanisms such as telephone or Internet remote authorizations against the linked account card.

The merchant seeks authorization for each transaction from an authorization server 130 through a processing network 120, such as through the VISA™, MASTERCARD™ or other network which may adapted for transaction processing against a debit card or other cash account.

The authorization server 130 may be maintained by the institution that issues the linked account card and may include an account information database, an account balance database, and/or a transaction history database and other components. The authorization server 130 may be provided with a first interface 136 to the cash account 160, and a second interface 138 to the credit account 140. Transactions made using the linked account card may be first processed against the cash account 160 designated by the cardholder, via an automated clearing house (ACH) 150. If the cash account 160 does not contain adequate funds and the authorization is rejected, the authorization server may temporarily suspend use of the card and process the transactions as a credit charge against a credit account 140. This credit account may also be designated by the cardholder, and act as an overdraft account protecting the cash account 160.

One or more sweeps against the cash account may be automatically performed at a later time to check for sufficient funds to satisfy the overdraft amount charged to the credit account 140. If sufficient funds are present in the cash account 160 at the time of a subsequent sweep, the funds may be withdrawn and applied to the credit account 140 to clear that account. The consumer may incur a fee for the use of the credit account 140. If subsequent sweeps of the cash account do not find sufficient funds, the linked account card privileges may remain suspended and the cardholder faces accumulating interest charges on the outstanding credit card balance.

The account transaction system according to the invention in one regard will be described in additional detail below.

Setting Up the Account

Figure 2:
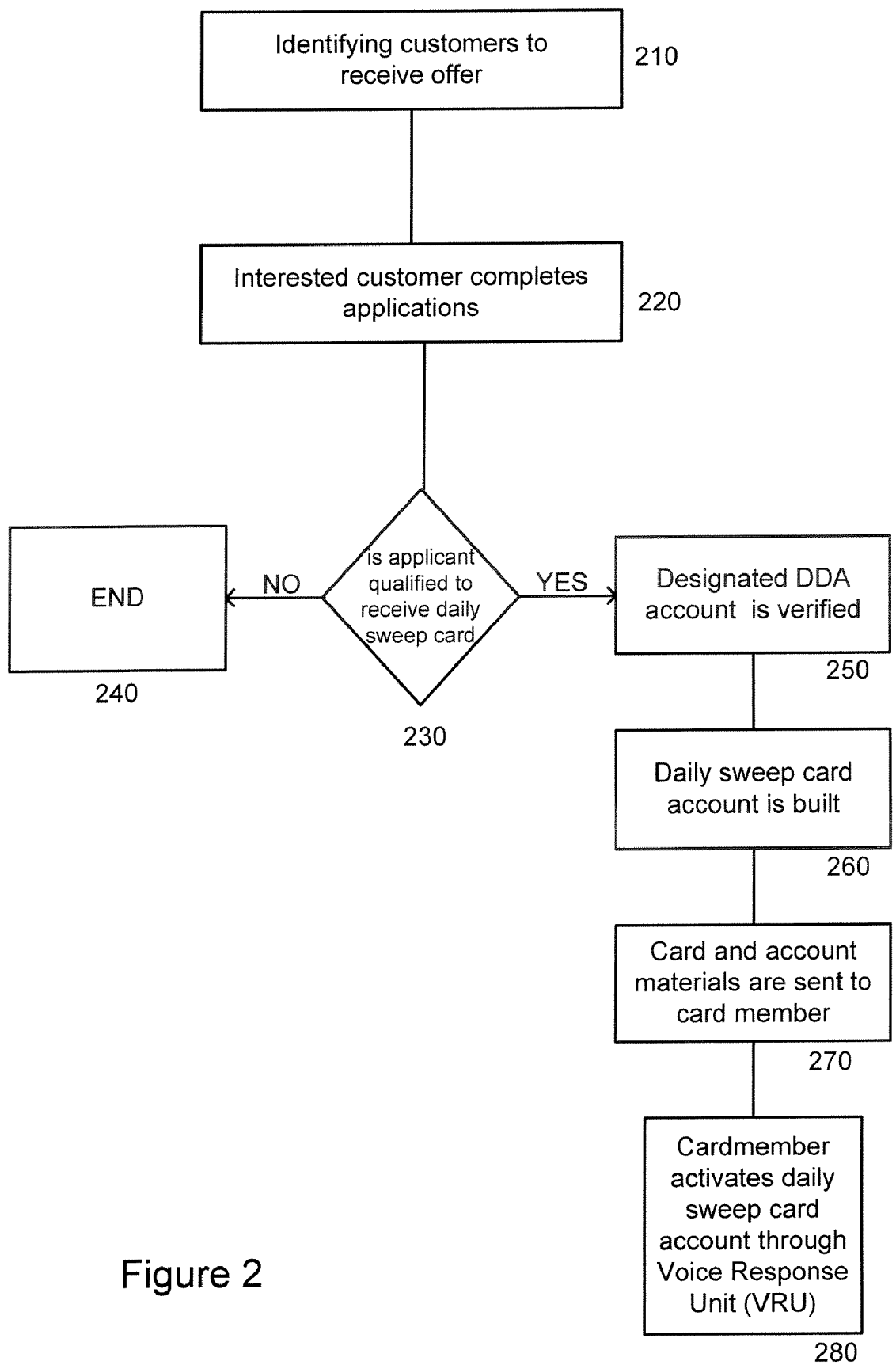
FIG. 2 is a flowchart which illustrates the establishment of a linked account card account according to an embodiment of the invention.

FIG. 2 illustrates steps that may be followed when establishing a linked account card account according to one embodiment of the invention. Potential linked account cardholders may be identified through known marketing solicitation techniques, illustrated at step 210. These potential cardholders, or applicants, may be required to complete an application in step 220 requesting information pertaining to their financial history.

In step 230, the potential cardholder's application may then processed by the institution that issues the linked account card. This results in a determination of the applicant's eligibility to receive a linked account card. Credit decisioning may be handled through known services, such as the Magnum™ engine or the like. If a negative decision is made, in step 240 the applicant may be denied a linked account card. If the applicant is approved, at least two additional pieces of information may be required.

First, as illustrated in step 250, a potential cardholder may be asked to designate a demand deposit account (DDA) or other backing account that will provide the cash funds for purchases made with the linked account card. The designated cash account may be a checking account, a savings account or other account held at a bank or other institution. In an alternative embodiment discussed below, more than one cash account may be selected to provide the cash or cash equivalent for transaction processing.

A second item that a potential cardholder may be required to provide in step 250 is a designated credit or other account to handle overdrafts. This may be an existing credit card or other account. If the linked account cardholder does not already have an existing credit account, one may be established through the institution that is issuing the linked account card. Once these accounts have been identified, they may be verified before the linked account card account is established in step 260.

Finally, in step 270 the linked account card itself may be mailed to the new cardholder along with the materials explaining the nature of the account. Upon receiving these materials, the cardholder may call a voice response unit (VRU) or other facility to activate the card, as illustrated in step 280.

The linked account card provided to the cardholder may bear a VISA™, MASTERCARD™ or other acceptance mark. The linked account card may have a daily spending limit, which may be referred to as an "open to buy" amount. This means that, on any given day, the cardholder will only be able to purchase goods and services up to that dollar amount, regardless of the cardholder's cash balance.

This daily spending limit or "open to buy" amount may be determined by the credit history information received during processing of the cardholder's application or otherwise. The daily spending limit may also be monitored on a daily basis by the authorization server 130 maintained by the card-issuing institution.

Authorizing Transactions

Figure 3:
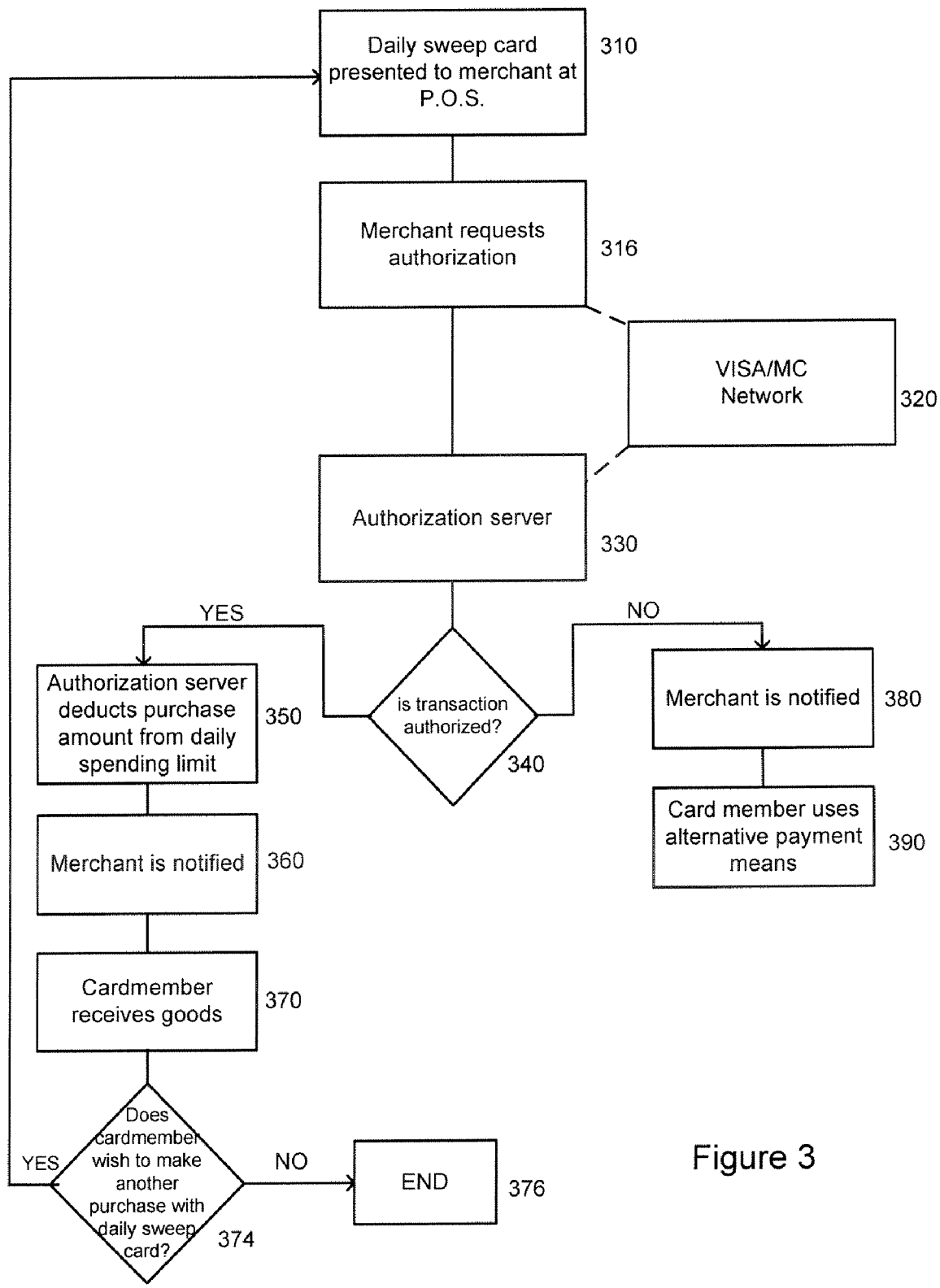
FIG. 3 is a flowchart which illustrates a process of authorizing transactions made with a linked account card according to an embodiment of the invention.

FIG. 3 illustrates a process of authorizing purchases that the cardholder wishes to make using the linked account card according to an embodiment of the invention.

In step 310, the cardholder may present the linked account card to the merchant. In step 316, the merchant may request authorization from an authorization server through a processing network, such as the VISA™, MASTERCARD™, or other network. The authorization server 130 determines in step 340 whether the transaction may be authorized. This determination may depend in part on whether the cardholder's daily cumulative spending limit or "open to buy" amount has been reached.

If it has, the authorization server 130 may not authorize the transaction. If the daily spending limit has not been reached, the authorization server 130 may authorize the transaction. The authorization server 130 may also process authorizations against this "open to buy" amount using business rules established by the institution issuing the linked account card, along with other financial rules.

If the transaction is not authorized, in step 380 the merchant may be notified and the cardholder may abandon the purchase or select another form of payment, as illustrated in step 390.

If the transaction is authorized, in step 350 the authorization server 130 may keep a record of what amount of the daily spending limit has been used by the purchase. In step 360, the merchant may be notified that the transaction has been authorized, allowing the cardholder to receive the goods or services purchased in step 370.

If the cardholder wishes to make another purchase using the linked account card, the process may be re-entered at step 310. Otherwise, the process flow illustrated in FIG. 3 may end at step 376.

Settling Transactions

Figure 4A:
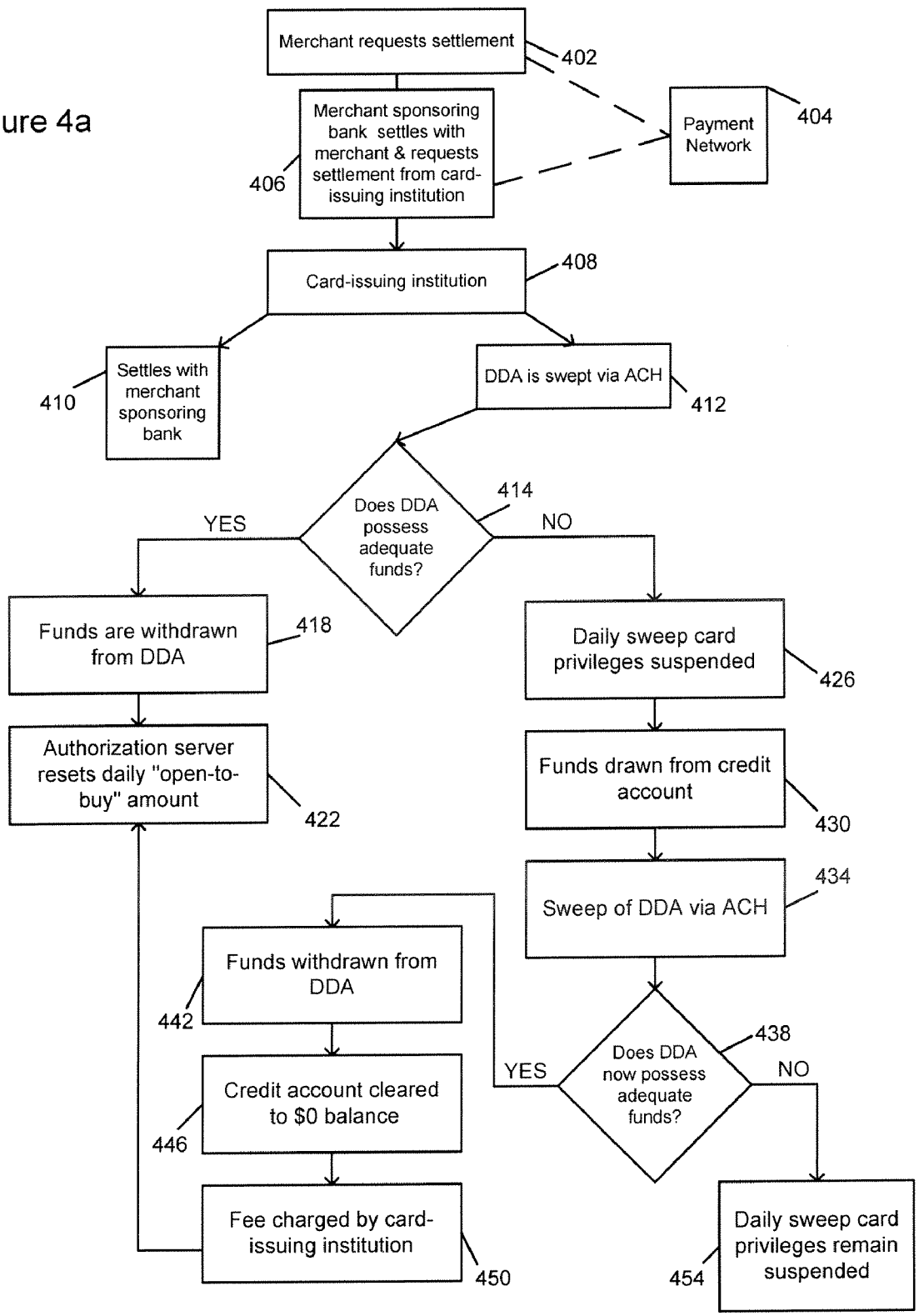
FIG. 4a is a flowchart illustrating the settlement of transactions initiated through use of a linked account card, according to an embodiment of the invention.

Subsequent to the completion of an authorized transaction, the merchant may issue a settlement request, as illustrated by step 402 in FIG. 4a. Such a request may be sent to the merchant's sponsoring bank or financial institution, through a processing network 404, such as the VISA™, MASTERCARD™, or other network which may be adapted for transaction processing against a debit card or other cash account. At step 406, the merchant's sponsoring bank or financial institution may pay the merchant, while simultaneously sending a request for payment to the institution 408 that issued the linked account card. As illustrated in step 410, the card-issuing institution 408 may then settle with the merchant's sponsoring bank or financial institution through an automated clearing house (ACH), as appreciated by persons skilled in the art.

Aside from settlement with the merchant's sponsoring bank, the card-issuing institution 408 has to settle with the cardholder. For each transaction initiated with the linked account card, individual automated clearing house debits may be generated which contain the unique merchant identification in the descriptor field such that the merchant identification appears on the cardholder's cash account statement.

At a predetermined time, such as at, near or just after the end of each day, the cardholder's designated cash account may be swept via an automated clearing house to determine whether adequate funds exist to cover all of the day's charges accumulated through use of the linked account card. This is illustrated in step 412. At step 414, an inquiry may be made to determine whether the designated cash account has sufficient funds to cover all of the individual debits that were generated by the authorization server 130 in response to the charges accumulated using the linked account card.

If adequate funds are present in the cardholder's designated cash account 160 at the time of reconciliation, the funds may be withdrawn from the cash account 160 in step 418 and the authorization server 130 may reset the daily spending limit to its full amount in step 422 for the following day.

If the designated cash account 160 does not have sufficient funds to cover the purchases at the time of the sweep, the authorization server 130 may draw the funds from the available credit on the credit account 140 that was designated by the cardholder as illustrated in step 426.

At this point, the authorization server 130 may be configured to temporarily suspend the cardholder's ability to make further purchases with the linked account card, in step 430. Step 430 will occur regardless of whether the daily spending limit or "open to buy" amount has been reached.

It may be noted that there are different variations possible when determining how the accumulated daily transactions will be added up and applied against the designated cash account 160.

In one embodiment, a FIFO (first-in, first-out) system may be used, wherein the daily charges will be applied against the cash account 160 in the order in which they were made. As soon as a debit is found that cannot be drawn from the cash account 160 due to insufficient funds, the credit account 140 may be applied to cover that particular charge, as well as any remaining charges up to a credit limit of that account.

Additionally, in another embodiment the sequence of daily charges may be applied against the cash account 160 based on the relative size of the transaction amount. For example, all of the smaller charges may be drawn against the cash account 160 first, leaving only the remaining larger charges that cannot be satisfied to be covered via the credit account 140. Conversely, the larger purchases may be drawn against the cash account 160 first, leaving only the smaller charges to be covered by the credit account 140 when funds in the cash account 160 become insufficient.

Another embodiment may be employed when the cash account 160 can only handle a percentage of a particular charge. For example, assume that charges are being applied against the cash account 160 during a sweep. If the cash account 160 reaches a point at which it can only cover a certain percentage of a charge being applied against it, the system may be configured to have the cash account 160 cover whatever percentage of the charge it can, only sending the shortfall to the credit account 140. Or, the system may be configured to have the entire charge be covered by the credit account 140.

According to the invention, and as seen in step 434, the cash account 160 may be swept again at a later time, such as 12:01 am on the next day, to determine whether or not the cash account 160 now contains sufficient funds as reflected in updated ACH activity.

This sweep may be performed in order to catch deposits that may have been made to the cash account 160 during the same day as the transaction activity, but not credited to the cash account 160 until the following business day. For example, the cardholder may have realized that a purchase was made with the card that could not be covered by the funds in the cash account 160. The cardholder may have rushed to deposit funds into the cash account 160 in order to ensure that the purchase would be covered, only to have the deposited funds be credited to the cash account 160 after the initial authorization attempt.

At step 438, another inquiry may be made to determine whether the cash account 160 contains adequate funds.

If there are now adequate funds in the cash account 160, the funds will be drawn from the cash account 160 in step 442, and the overdraft amount that was initially drawn against the credit account 140 may be cleared from the credit account 140 in step 446. The cardholder may incur a fee for the temporary use of the credit account in step 450, and the linked account card may be reactivated with the daily spending limit be replenished in step 422.

In the event that there are still inadequate funds in the cash account 160 when the second sweep is performed, the linked account card account may remain suspended in step 454 until such time as the overdraft amount charged to the credit account 140 is paid off and there is a positive balance. The cardholder may then be subject to a fee, as well as any accumulating interest charges on the credit account. Again, this is unlike a typical debit card, where once a cardholder is forced to use the overdraft credit line, they may continue to do so until their line of overdraft credit is maxed out. In other words, conventional debit cards do not have the added safety feature of suspending the account and disallowing the user to accumulate more debt.

According to the invention, the cardholder may have access to their transaction history and daily spending limit information, via an interactive voice response (IVR) unit. This information may also be accessible through a web-site hosted by the card-issuing institution. Again, charges processed against the cardholder's cash account 160 may appear on the cardholder's monthly cash account statement as well.

In an alternative embodiment of the invention, two or more sweeps of the cash account may occur before requiring payment of the credit advanced in order to restore card privileges. In other words, the number of subsequent sweeps of the cash account 160 can be varied by the institution issuing the card.

Figure 4B:
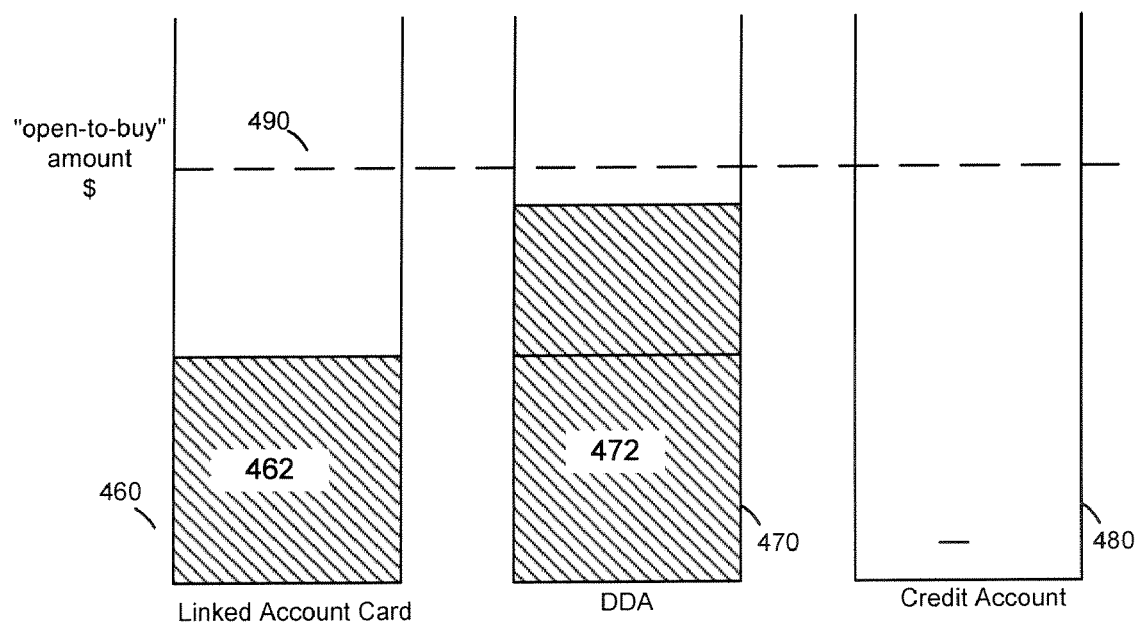
FIG. 4b is a graphical representation of one example of the settlement of transactions initiated through use of a linked account card, according to an embodiment of the invention.
Figure 4C:
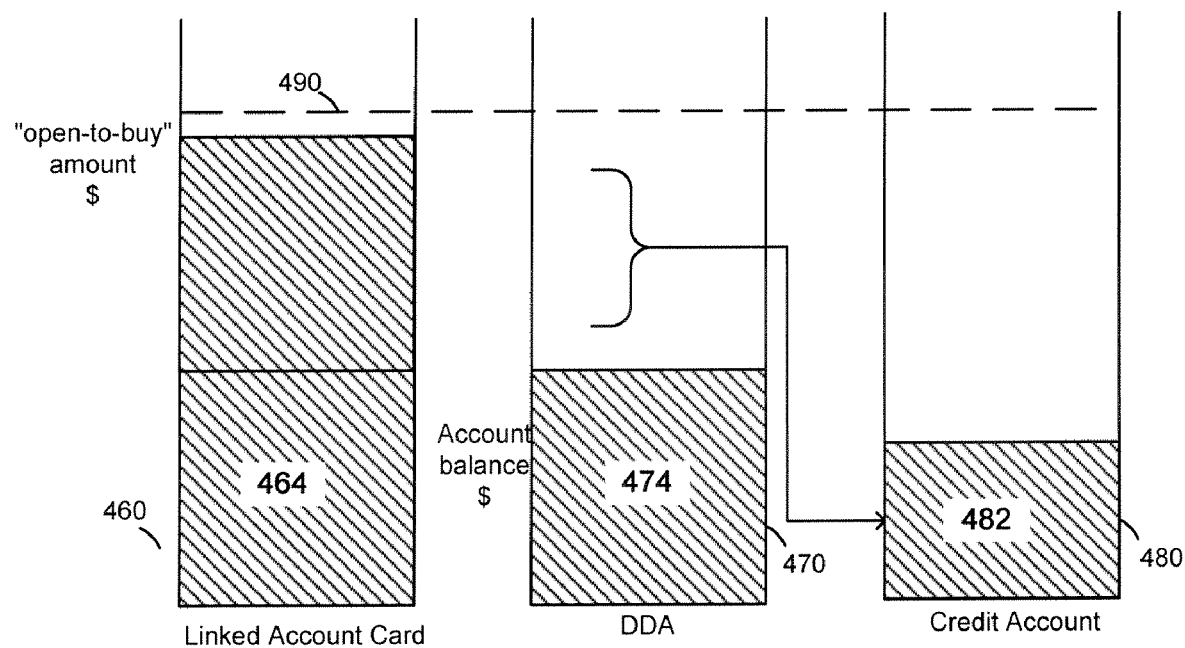
FIG. 4c is a graphical representation of one example of the settlement of transactions initiated through use of a linked account card, according to an embodiment of the invention.

FIGS. 4b and 4c illustrate settlement transactions initiated through use of a linked account card, according to an embodiment of the invention. FIG. 4b illustrates an instance in which the linked account card 460 has been used to purchase goods and services which total a dollar amount 462 that is less than the card's "open to buy" amount 490. When the predetermined time (which may be near the end of the day) arrives for the sweep of the designated cash account 470, it is seen that the cash account 470 has an adequate balance 472 to cover the cost of the day's purchases. Accordingly, the funds can be withdrawn from the cash account 470, and no overdraft action against the credit account 480 is needed.

FIG. 4c illustrates an example in which a cardholder has maxed out the "open to buy" amount 490 of the linked account card 460, by purchasing goods and services in a graphically illustrated dollar amount 464 that exceeds the "open to buy" amount 490. In this example, when the predetermined time arrives for the sweep of the designated cash account 470, it is discovered that the balance 474 of the cash account is inadequate to cover the aggregate of the day's purchases. At this point, the funds 482 that cannot be drawn from the designated cash account (the overdraft amount) may be drawn from the credit account 480. Additionally, the authorization server may temporarily suspend the cardholder's ability to make further purchases with the linked account card.

It may be noted that there may be an instance in which the cardholder, on one day, reaches the maximum "open to buy" amount of the card, while having a zero balance in the designated cash account to cover the purchases. For this reason, the credit account may preferably have a credit line equivalent to the "open to buy" amount of the linked account card.

In an alternative embodiment of the invention, the institution issuing the linked account card may choose to allow a cardholder to continue to use the linked account card once the cash account 160 is found to have insufficient funds. The cardholder may be given the option of continuing to draw from the remaining credit line available on the collateral card. This may be a desirable option for individuals who desire a traditional debit card, however are unable to have one because their bank does not offer the service.

In another alternative embodiment of the invention, the linked account card may be linked to multiple cash accounts designated by the cardholder in order to allow each to be swept in search of sufficient funds before the credit account 140 is needed.

Figure 5:
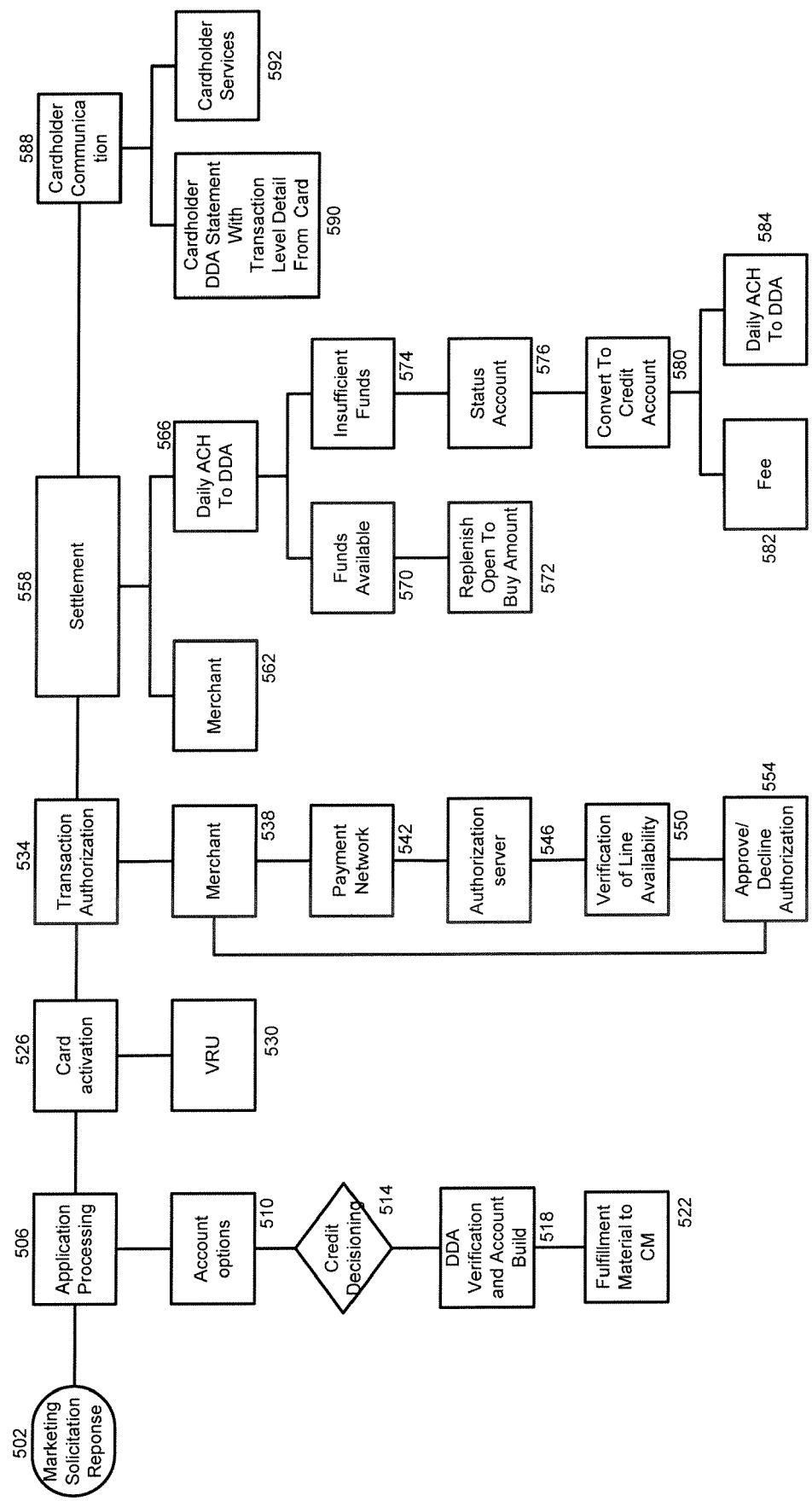
FIG. 5 is a flowchart illustrating overall processing according to the invention, in another regard.

FIG. 5 illustrates overall processing according to the invention, in another regard.

In step 502, marketing solicitation is performed in order to identify potential linked account cardholders. Interested applicants may be required to complete an application detailing certain information pertaining to their financial history. Processing the application, as illustrated in step 506, may comprise the steps of identifying account options most suited for each particular applicant (step 510), and making a decision regarding the applicant's ability to satisfy the particular requirements of these options (step 514). If it is determined that the applicant is approved, they will be required to specify a demand deposit account or other backing account that will provide the funds for purchases made with the linked account card. In step 518, the designated cash account may be verified and the cardholder's linked account card account may be created.

Upon furnishing the linked account card and the account materials to the new cardholder (step 522), the cardholder may activate the card by calling a voice response unit (VRU), as seen in steps 526 and 530.

Each purchase or transaction that the cardholder wishes to make with the linked account card may be subject to authorization (step 534). When a cardholder desires to make a purchase, and presents the card to a merchant, the merchant may request authorization from an authorization server through a payment network. This is illustrated in steps 538, 542, and 546, respectively. In step 550, the authorization server may check to see whether or not the daily "open to buy" amount of the linked account card has been reached. The results of this check, coupled with the adherence to pertinent financial rules, can result in the determination of whether or not authorization for the transaction will be approved or denied (step 554).

Subsequent to the completion of an authorized transaction, settlement with the merchant occurs, as is illustrated in step 562. The merchant may make a settlement request which is sent to the merchant's sponsoring bank or financial institution, through a processing network. The merchant's sponsoring bank or financial institution may pay the merchant, while simultaneously sending a request for payment to the institution that issued the linked account card. Settlement between the card-issuing institution and the merchant's sponsoring bank or financial institution may occur through an automated clearing house.

Aside from settlement with the merchant's sponsoring bank, the card-issuing institution has to settle with the cardholder. In step 566, the cardholder's designated cash account may be swept to determine whether adequate funds are present to cover all of the day's charges accumulated through use of the linked account card. Note that the cash account may be swept at any pre-determinable time, which may typically be near the end of the day. If there are adequate funds available in the designated cash account (step 570), the funds may be withdrawn from the cash account and the authorization server 130 may reset the daily "open to buy" amount to its full amount in step 572 for the following day.

If the designated cash account does not have sufficient funds (step 574) to cover the charges at the time of the sweep, the status of the account may be evaluated at step 576, and the cardholder's ability to make further purchases with the linked account card may be temporarily suspended. Additionally, the authorization server 130 may draw the necessary funds from the available credit account, as illustrated in step 580. The cardholder may be charged a fee for the use of this credit account (step 582). Finally, one or more subsequent sweeps of the designated cash account may occur, as illustrated by step 584. If adequate funds are present, they will be withdrawn from the cash account, and the credit account will be cleared. Otherwise, the daily purchasing abilities afforded the cardholder through use of the linked account card may continue to be suspended until the credit account is settled.

Communication with the cardholder (step 588) may take one or more forms. Statements of linked account card activity will be sent on a regular basis to the cardholder detailing each card transaction (step 590). Additionally, the cardholder may have access to their transaction history and daily spending limit information, via additional services (step 592) such as an interactive voice response (IVR) unit. This information may also be accessible through a web-site hosted by the card-issuing institution.

Other embodiments, uses and advantages of the invention will be apparent to those skilled in the art from consideration of the specification and practice of the invention disclosed herein. The specification should be considered exemplary only, and the scope of the invention is accordingly intended to be limited only to the following claims.

The invention claimed is:

1. A system for facilitating electronic transactions, the system comprising:
   a transaction card containing point-of-sale readable information, the transaction card being issued by an issuer to a qualified consumer, wherein the qualified consumer becomes a cardholder having a privilege to execute purchase transactions with the transaction card at a plurality of merchants by submitting valid demand deposit account (DDA) information for a checking account of the cardholder, and wherein the checking account is provided by a financial institution other than the issuer of the transaction card;
   an authorization server adapted for communication, through a payment network, with point-of-sale transaction terminals; and
   programming associated with the authorization server for:
      receiving transaction information, through the payment network, from one of the point-of-sale transaction terminals in response to an attempted transaction by the cardholder using the transaction card,
      issuing a declined message and terminating card processing if the transaction card is invalid or the attempted transaction falls outside limits of card usage,
      authorizing the transaction by generating a debit transaction for the checking account of the cardholder utilizing an automated clearing house (ACH) network, and
      settling the transaction at a time subsequent to the execution of the transaction by sweeping funds from the checking account of the cardholder.

2. A computer-implemented method for executing electronic funds transactions, the method comprising:
   issuing, by a card-issuing institution, a transaction card to a cardholder, the transaction card being linked to a checking account held by the cardholder at a financial institution different from the card-issuing institution, wherein the cardholder qualifies for the transaction card by submitting valid demand deposit account (DDA) information of the checking account, the transaction card account data and the DDA information of the checking account being stored by the card-issuing institution in one or more storage media;
   receiving, by a merchant, the transaction card as a form of payment from the cardholder desiring to execute a transaction with the merchant, wherein information associated with the transaction card is extracted from the transaction card and information associated with the transaction is generated;
   receiving, at an authorization server, the information associated with the transaction card and the transaction, the authorization server having access to a storage medium containing the transaction card account data of the cardholder;
   issuing, by the authorization server, a declined message and terminating card processing if the transaction card is invalid or if the requested transaction falls outside limits of card usage;
   authorizing, by the authorization server, the transaction without immediately settling the transaction against the checking account of the cardholder if the transaction card is valid and the requested transaction falls within the limits of card usage; and
   settling the transaction, at a time subsequent to the execution of the transaction, through automated clearing house (ACH) from funds retained within the checking account of the cardholder based at least in part on the DDA information of the checking account.

3. A computer-implemented method for facilitating electronic funds transactions, the method comprising:
   issuing, by a card-issuing institution, a transaction card to a cardholder by associating the transaction card with a demand deposit account from which the cardholder is authorized to electronically disburse funds, the demand deposit account being held by the cardholder at a financial institution different from the card-issuing institution, the card-issuing institution storing the transaction card account data and the demand deposit account information in one or more storage media;

receiving, at an authorization server having access to a storage medium containing the transaction card account data of the cardholder, an authorization request for an attempted transaction between a merchant and the cardholder, the authorization request containing information associated with the transaction card and the attempted transaction;

processing, by the authorization server, the authorization request based on one or more predetermined business rules;

authorizing, by the authorization server, the transaction without immediately settling the transaction against the demand deposit account of the cardholder; and settling the transaction, at a time subsequent to the execution of the transaction, through automated clearing house (ACH) from funds retained within the demand deposit account of the cardholder based at least in part on the demand deposit account information.

4. The method according to claim 3, wherein the cardholder becomes qualified for the transaction card by providing a personal identification, an account number and a routing number associated with the demand deposit account.

5. The method according to claim 3, wherein the step of processing the authorization request further comprises evaluating the attempted transaction in relation to one or more predetermined account limitations.

6. The system according to claim 1, wherein the issuer of the transaction card is a financial institution.

7. The system according to claim 1, wherein the issuer of the transaction card is not a financial institution.

8. The method according to claim 2, wherein the card-issuing institution is a financial institution.

9. The method according to claim 2, wherein the card-issuing institution is not a financial institution.

10. The method according to claim 3, wherein the card-issuing institution is a financial institution.

11. The method according to claim 3, wherein the card-issuing institution is not a financial institution.

* * * * *